United States Patent [19]
Penet

[11] 3,735,637
[45] May 29, 1973

[54] FLOW-METER AND VISCOMETER

[76] Inventor: Pierre Marie Marcel Penet, 4, Rue de Bourgogne, Creteil, France

[22] Filed: Apr. 15, 1971

[21] Appl. No.: 134,306

[52] U.S. Cl. .................. 73/231 R, 73/231 M, 73/59
[51] Int. Cl. ........................ G01f 1/00, G01m 11/00
[58] Field of Search ............... 73/231, 231 M, 59, 73/194 M, 194, 229

[56] References Cited

UNITED STATES PATENTS

| | | | |
|---|---|---|---|
| 3,201,987 | 8/1965 | Ackerman | 73/231 M |
| 3,177,712 | 4/1965 | Brooking | 73/231 M |
| 3,043,141 | 7/1962 | Waugh et al. | 73/194 M |
| 3,301,052 | 1/1967 | Lee et al. | 73/231 |
| 3,498,129 | 3/1970 | Bodge | 73/231 M |

FOREIGN PATENTS OR APPLICATIONS 172,072  10/1965  U.S.S.R. .......................... 73/231 M

Primary Examiner—Richard C. Queisser
Assistant Examiner—John P. Beauchamp
Attorney—William J. Daniel

[57] ABSTRACT

Measuring apparatus of the impeller-type flowmeter kind, designed to be mounted inside a conduit for ducting a fluid flow and comprising an impeller supported for unrestrained rotation about a shaft arranged longitudinally inside the conduit. In accordance with the invention, a rotor is supported for unrestrained rotation coaxially with and downstream of the impeller and carries blades which lie substantially in planes passing through the rotor axis, whereby a comparison between the impeller and rotor rotation speeds $\omega$ and $\omega_1$, respectively, enables the accuracy of the flow rate measurement to be monitored and can provide an indication of the viscosity of the fluid.

16 Claims, 6 Drawing Figures

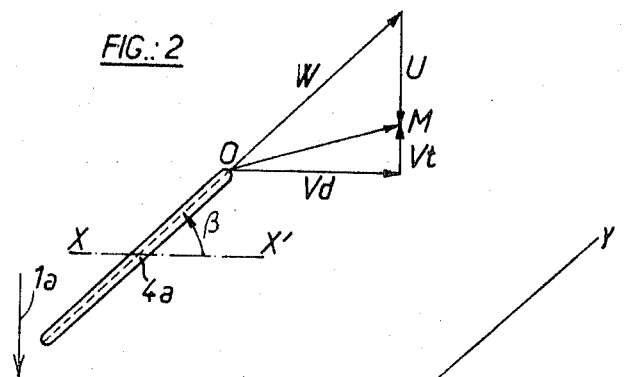
FIG.: 2
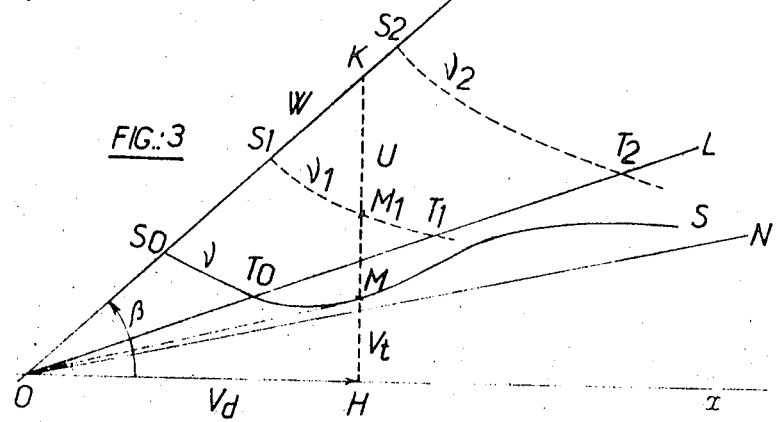
FIG.: 3
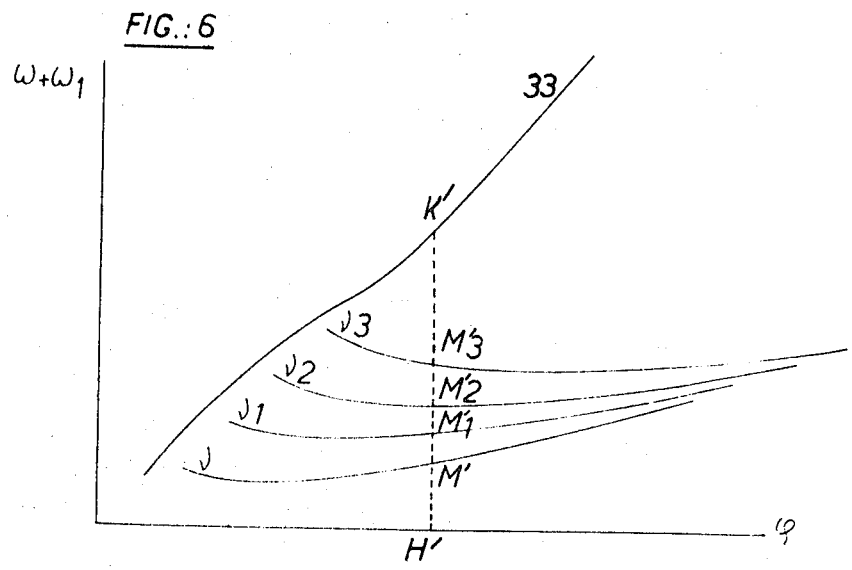
FIG.: 6

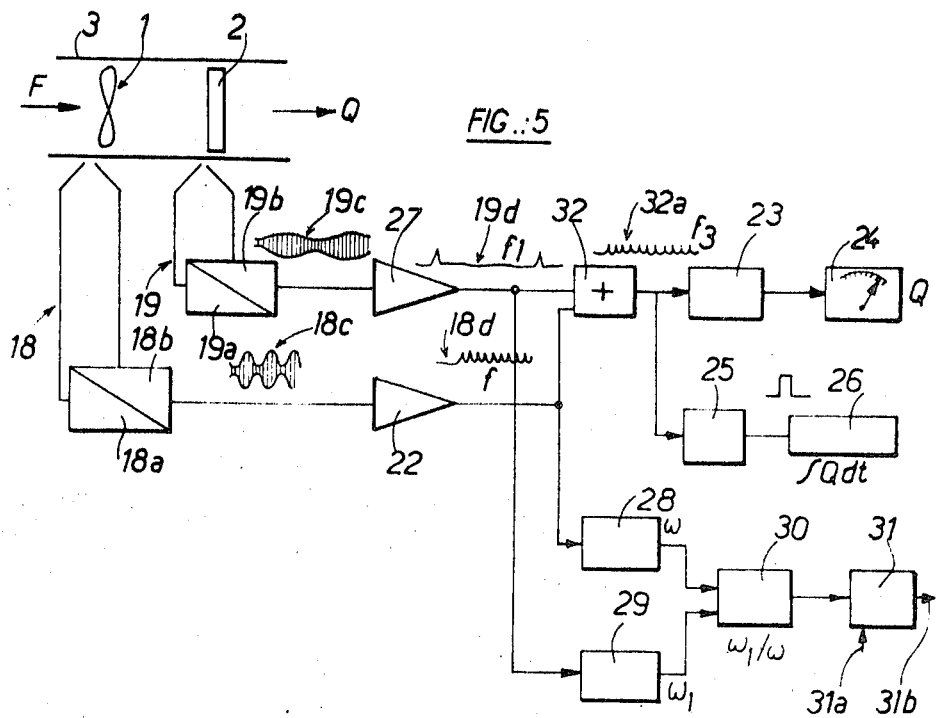
FIG.:5
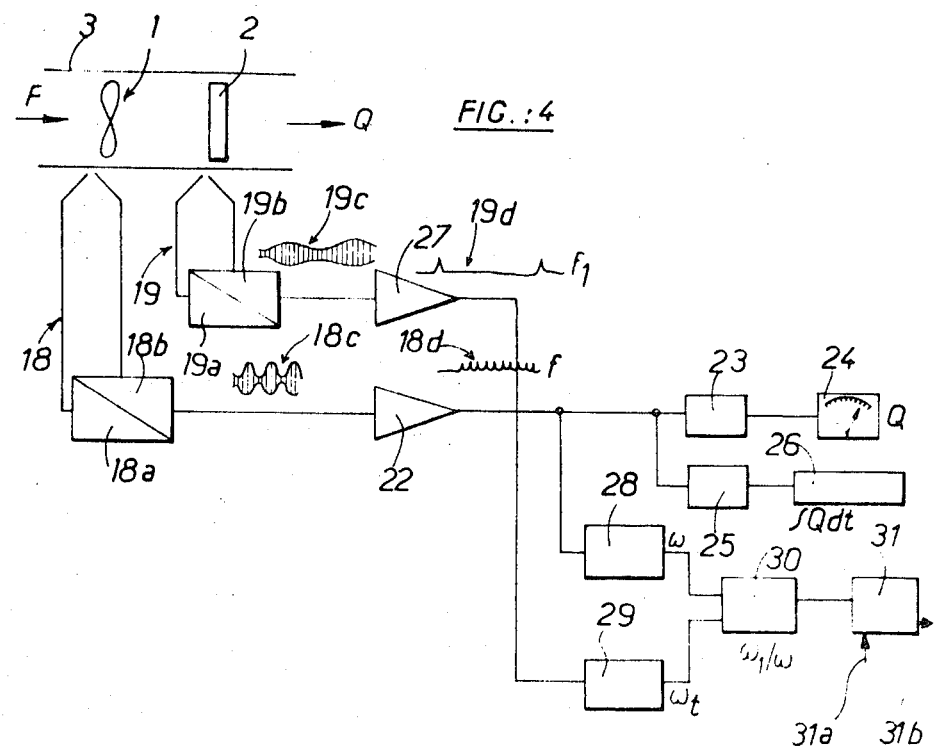
FIG.:4

FLOW-METER AND VISCOMETER

This invention relates primarily to industrial flowmeters which are used to measure the flow of a fluid through a conduit and accordingly comprise an impeller with skew blades that is to say an impeller having blades of helical pitch, set in motion by the fluid, and means for measuring the rotation speed of the impeller. The invention further relates to impeller type apparatus for industrial type measurements of the viscosity of a substance flowing through a conduit.

The impeller in prior art industrial flowmeters is mounted for unrestrained rotation about a shaft arranged longitudinally inside the conduit, so that it rotates at a speed which, within certain fluid flow-rate and viscosity limits, is for all practical purposes proportional to the fluid flow rate. The rotation speed of the impeller in a conventional flowmeter accordingly provides a fairly accurate measurement of the flow rate, but only provided that the latter lies within certain limits and that the viscosity of the fluid is in the region of that for which the flowmeter was designed and calibrated. No existing flowmeter of the impeller type makes it possible to know at all times whether it is functioning correctly or not, nor does it give an indication concerning the accuracy of the flow measurement, whereas in fact the characteristics and in particular the viscosity of the substance flowing through an industrial type conduit may vary accidentally from one instant to another.

No flowmeter will give an indication of the viscosity of the substance whose flow rate is being measured.

The present invention has for its object improvements which on the one hand permit of monitoring and testing the functioning of an impeller type flowmeter and, on the other, provide for a correction enabling the flowmeter to be used for measuring the flow rates of fluids of high or variable viscosity. These improvements make it possible furthermore to construct a flowmeter which will indicate the viscosity of the fluid at the same time as its flow rate, or to construct an impeller type unit capable of being mounted in series with a flowmeter and or providing an approximate viscosity measurement.

In accordance with this invention, the impeller with skew blades, which is mounted for unrestrained rotation in the manner of a conventional flowmeter propeller, is associated to an auxiliary rotor rotatably mounted coaxially with said propeller and downstream thereof and carrying straight blades, namely blades lying in planes passing through their common axis, or in other words an auxiliary rotor having substantially feathered blades. Means are provided for measuring the rotation speed $\omega_1$ of the auxiliary rotor and for comparing and/or combining it with the rotation speed $\omega$ of the impeller.

In one form of embodiment, the flow measurement is provided in classic manner by the impeller rotation speed $\omega$, and the variations in the ratio $\omega_1/\omega$, preferably calculated by a computer, make it possible to know whether the flowmeter is functioning correctly or not.

In an alternative embodiment of the invention, the flow measurement is provided by the sum of the absolute values of the rotation speeds $\omega$ and $\omega_1$, after possible application of correction factors, thereby making it possible to measure the flow rate of a high-viscosity or variable-viscosity fluid with sufficient precision for industrial needs. In this particular embodiment, the ratio $\omega_1/\omega$ further enables faulty operation of the flowmeter to be detected.

An increase in the viscosity of a fluid flowing at a given rate will cause the impeller to slow down and the auxiliary rotor to speed up, so that a comparison between $\omega$ and $\omega_1$ provides an indication of the viscosity and possibly even an approximate value thereof.

The description which follows with reference to the accompanying non-limitative exemplary drawings will give a clear understanding of how the invention can be carried into practice.

In the drawings:

FIG. 2 is a developed view on an enlarged scale of the profile of an impeller blade at the level of line II—II in FIG. 1, showing the velocity vector diagram at the point of exit from the profile.

FIG. 3 is a diagram illustrating the manner of operation of the impeller.

FIG. 4 is a diagram of the circuit for measuring and processing the rotation speeds of the impeller and the auxiliary rotor.

FIG. 5 is a diagram similar to FIG. 4 of an alternative embodiment.

FIG. 6 shows the general aspect of an abacus or chart for measuring viscosity.

Figure 1:
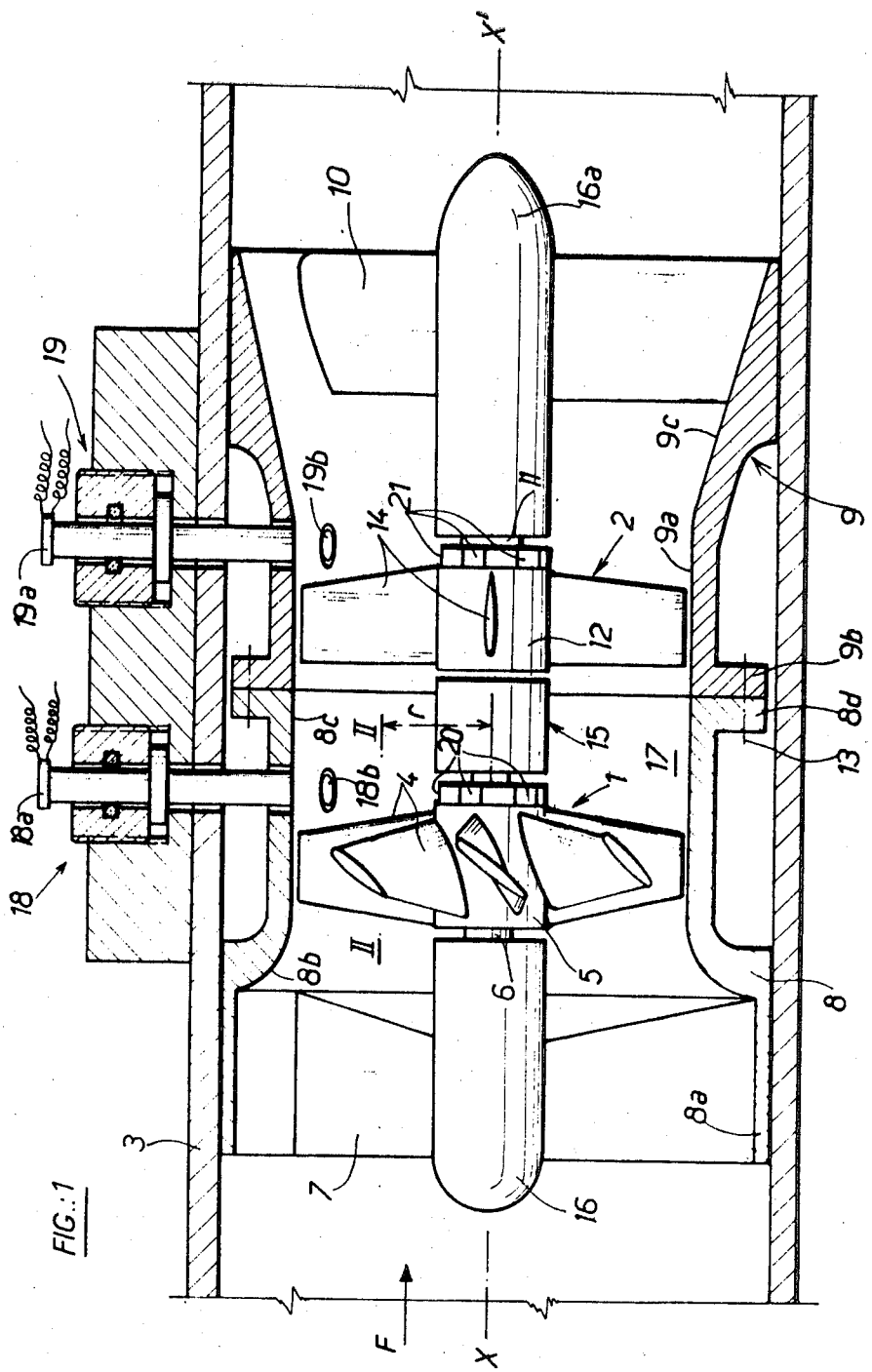
FIG. 1 is a diagrammatic showing in axial section of a flowmeter according to this invention.

Reference is first had to FIG. 1 for a diagrammatic showing of a flowmeter according to this invention comprising a conventional impeller 1 and an auxiliary rotor 2 mounted coaxially therewith within a conduit section 3 for measuring the flow rate of a fluid through the conduit in the direction of arrow F. Impeller 1 carries skew blades 4 that is to say blades of helical pitch, and its hub 5 is supported in classic manner for unrestrained rotation on ball-bearings (not visible) on a shaft 6 supported cantilever-fashion by three radial struts 7 spaced 120° apart and fast with an annular member 8 the forward cylindrical portion 8a of which is restrained (by means not shown) inside conduit section 3 in such manner that the rotation axis of propeller 1 coincides with the axis XX' of the conduit section. Downstream of cylindrical portion 8a, the member 8 is formed with a matching convergent section 8b followed by a cylindrical wall 8c formed with an external terminal flange 8d at its downstream end. Similarly, an annular member 9, comprising a cylindrical wall 9a formed with an external flange 9b at its upstream end and followed by a recovery divergent section 9c fast with three radial arms 10 supporting a cantilevered shaft 11 over which the hub 12 of auxiliary rotor 2 is freely rotatable on ball-bearings (not visible), is restrained (by means not shown) within conduit section 3 in such manner that the rotation axis of the auxiliary rotor coincides with axis XX'. The flanges 8d and 9b are bolted together as at 13.

It is to be noted that the ball-bearings (not visible) introduce negligible friction and therefore oppose virtually no resistance to rotation of impeller 1 and rotor 2. Impeller 1 and rotor 2 are consequently mounted freely rotatable, that is to say that their rotation is for all practical purposes unrestrained.

Hub 12 of auxiliary rotor 2 supports blades 14 which, as shown in the drawing, lie in radial planes passing through axis XX', in other words blades 14 are substantially feathered blades. Shaft 6 extends downstream of propeller 1 almost up to auxiliary rotor hub 12, and shafts 6 and 11 are thickened between hubs 5 and 12 and also on either side thereof whereby to form about axis XX' a cylindrical body 15 having ogival upstream and downstream terminations 16 and 16a. Impeller 1 and auxiliary rotor 2 are accordingly mounted one behind the other in the annular passage 17 formed between the cylindrical outer surface of body 15 and the cylindrical inner surfaces of walls 8c and 9a extending respectively downstream of convergent section 8b and upstream of divergent section 9c. The fluid flowing through conduit section 3 generates within passage 17 a flow consisting of parallel streamlines which act upon the skew blades 4 and cause impeller 1 to rotate. As is well known, the rotation speed $\omega$ of impeller 1 is for all practical purposes proportional to the fluid mass flow rate Q, between certain flow rate and viscosity limits. The reaction of impeller 1 against the fluid flow causes a rotation opposite to that of the impeller to be imparted to the flow downstream of the impeller, whereby the rotating fluid acts on the blades 14 of auxiliary rotor 2 and rotates the latter at a speed $\omega_1$.

The rotation speeds $\omega$ of impeller 1 and $\omega_1$ of auxiliary rotor 2 are measured respectively by two ultrasonic devices 18 and 19 similar to the one which is described in French Patent Application No. 70 09886, filed Mar. 19, 1970 by the applicant, and which it is accordingly unnecessary to describe in detail herein. Impeller hub 12 is formed with flats 20 which, in the course of rotation of the impeller, in turn reflect toward receiver means 18b and ultrasonic radiation emitted by transmitter means 18a, whereby the excitation of receiver means 18b is paced proportionately to the impeller rotation speed $\omega$. Similarly, the device 19 includes receiver means 19b the excitation of which is paced proportionately to the rotor rotation speed $\omega_1$ by ultrasonic radiation emitted by transmitter means 19a and reflected off flats 21 on hub 12.

The theory of operation of the impeller will be more clearly understood with reference to FIG. 2, which shows the profile 4a of a blade 4 at a distance r from axis XX' and the velocity vectors at the point of exit from profile 4a. Arrow 1a shows the direction of rotation of the impeller. The relative velocity $\vec{W}$ of the fluid exiting from profile 4a is inclined to axis XX' at the same angle $\beta$ as profile 4a. The absolute velocity $\vec{V}$ of the fluid is the resultant of the relative velocity $\vec{W}$ and the tangential velocity $\vec{U}$ of profile 4a. The velocity $\vec{V}$ has an axial component $\vec{Vd}$ (called the throughout velocity) and a tangential component $\vec{Vt}$, which is the tangential velocity of the flow as it leaves profile 4a. If U, Vt and Vd be taken to be the magnitudes of the velocities $\vec{U}$, $\vec{Vt}$ and $\vec{Vd}$, then the velocity vector diagram shows that these magnitudes are related as $$U + Vt = Vd \tan \beta \quad (1)$$

Now U is equal to $\omega r$ and Vd is proportional to the flow rate Q, so that, at profile-4a level, there exists a relationship $$\omega r + Vt = kQ \tan \beta \quad (2)$$

where k is a constant. A relationship of the same form exists over the entire length of each impeller blade, from the hub to the tip. It will be clear therefore that the impeller rotation speed $\omega$ is related to the mass flow rate Q by a relationship of the form :

$$\omega = AQ - B \, Vtm \quad (3)$$

where A and B are constants and Vtm is the mean tangential velocity of the fluid leaving the impeller.

This last relation shows that the impeller rotation speed $\omega$ is not exactly proportional to the mass flow rate Q and that it will give a sufficiently accurate measurement of the latter only if the mean tangential velocity Vtm is small enough in relation to the flow rate, thus limiting the use of conventional flowmeters, as will be more clearly explained hereinbelow with reference to FIG. 3.

FIG. 3, in which the velocity vector diagram is reproduced on a bigger scale in dash lines, illustrates the theory of operation of the impeller, at profile-4a level, as the mass flow rate Q varies. The throughput velocity $\vec{Vd}$, which is proportional to the mass flow rate Q, is represented along a straight line Ox, and the relative velocity $\vec{W}$ along a straight line Oy inclined at the angle $\beta$ to straight line Ox. A curve SoS has been plotted which is the locus of the point M (the extremity of vector $\vec{OM}$ representing the velocity $\vec{V}$) as the mass flow rate Q varies, the viscosity of the fluid being constant. The straight lines OL and ON intercept between them that useful portion of curve SoS for which the rotation speed $\omega$ provides a measurement of the flow rate with the desired precision (e.g. to within $\pm$ 1 percent for an ordinary flowmeter or to within $\pm 0.1$ percent for a very accurate flowmeter). As the mass flow rate Q rises above zero, the imaginary point M initially shifts along the straight line Oy up to the point So, then along the curve SoS up to the point To, and thereafter along the useful portion ToS of curve SoS.

Since the torque applied to the impeller by the fluid is initially lower than the moment opposed by the impeller (which is the sum of the opposing mechanical moment and the opposing viscosity moment), the impeller remains stationary. Beyond the point So, the torque exceeds the opposing moment and the impeller begins to rotate. Between the points So and To, however, the tangential velocity Vt is large in relation to the throughput velocity Vd, so that the impeller rotation speed $\omega$ provides an insufficiently accurate measurement of the mass flow rate Q : the instrument is then said to be "outside tolerance limits." Only when the point M shifts along the portion ToS of the curve is the measurement made with the desired accuracy.

If the kinematic viscosity of the fluid increases from $\nu$ to $\nu_1$, $\nu_2$, etc., the viscous friction against the impeller (generating what has been referred to precedingly as the "opposing viscosity moment") increases also, causing the locus curve of imaginary point M to be modified as shown in dash lines: the point So shifts to S1, S2, etc. rightwardly along Oy, and the point To shifts to T1, T2, etc. rightwardly along OL. When the point M lies between S1 and T1, or between S2 and T2, for example, the rotation speed of the impeller provides no more than a very inaccurate measurement of the flow rate. Hence : the threshold for measurement with the required accuracy (i.e. the minimum flow rate value measurable with that degree of accuracy) rises with increasing viscosity; if the viscosity of the fluid varies accidentally, the rotation speed of the impeller could provide an incorrect indication of the flow rate without any warning being given.

Further, the impeller 1 may be subject to functional defects, caused for instance by variations in mechanical friction in a bearing or through blade distortion due to wear by erosion. These functional defects introduce measurement errors which cannot be detected merely from a knowledge of the impeller rotation speed.

The present invention enables these drawbacks to be overcome by means of the auxiliary rotor 2. The latter's rotation speed $\omega_1$ is substantially proportional to the mean tangential velocity $Vtm$, and this irrespective of the flow rate or viscosity of the fluid, with viscous friction effects introducing only longitudinal forces which have no effect on the rotation of rotor 2.

Reference to FIG. 3 shows that $Vt$ would be strictly proportional to $U$ if the portion $ToS$ of the M-locus curve were straight. It will readily be appreciated therefore that changes in the ratio $\omega_1/\omega$ indicate the changing positions of the point M on curve $SoS$. If this ratio remains substantially constant (within the permissible tolerance of ± 1 percent or 1 percent), it will be known that point M lies between the straight lines OL and ON and that the impeller 1 is consequently functioning correctly.

Reference is next had to FIG. 4 for a description of an embodiment of the invention in which the rotation speed $\omega$ of impeller 1 is used to measure the flow rate and the ratio $\omega_1/\omega$ to monitor operation of the impeller.

FIG. 4 schematically depicts the impeller 1 and the auxiliary rotor 2 arranged inside the conduit section 3 (through which a fluid flows in the direction of arrow F) and the ultrasonic devices 18 and 19.

The ultrasonic radiation emitted at 18a and reflected by the flats on impeller 1 during rotation thereof is received by receiver 18b, which receiver transmits a schematically represented signal 18c at high frequency (the ultrasonic radiation frequency) that is modulated proportionately to the impeller rotation speed. This signal is applied to a demodulating circuit 22 which converts it into a signal 18d the frequency $f$ of which is proportional to $\omega$. A frequency-analog converter 23 converts signal 18d into an analog signal (a voltage for example) which is proportional to $\omega$ and which is applied to a dial indicator 24 the pointer of which accordingly deflects proportionately to $\omega$. Dial instrument 24 can be calibrated, as well known per se, so that it gives a direct reading of the fluid mass flow rate $Q$. Signal 18d is further applied to a so-called divider circuit 25 which derives the quotient of the signal frequency $f$ divided by the constant of the apparatus (for instance, the volume of fluid which must flow through the impeller to cause it to complete one revolution) and produces an output signal proportional to this quotient which is applied to an integrator 26 which indicates the volume $\int Qdt$ having flowed through the apparatus.

Similarly, the receiver 19b of device 19 emits a signal 19c which is demodulated at 27 to produce a signal 19d the frequency $f1$ of which is proportional to the rotation speed $\omega_1$ of rotor 2. The signals 18d and 19d are transformed by two frequency-analog converters 28 and 29, respectively, into analog signals proportional to $\omega$ and $\omega_1$ respectively, the ratio $\omega_1/\omega$ of which is evolved by a circuit 30. The $\omega_1/\omega$ signal issuing from circuit 30 energizes a further indicator 31 which gives a direct reading of the value of ratio $\omega_1/\omega$. Indicator 31 may be supplemented by a visual or aural warning system 31a which is activated when the ratio $\omega_1/\omega$ exceeds a value which is preset on a reference system 31b.

Thus as soon as the flowmeter operates outside the permissible tolerance an immediate warning is given by system 31a. This feature can be most useful, especially for cases where the indications given by the flowmeter are used for billing purposes.

In cases where the viscosity of the fluid is high or variable, it is possible to use the rotation speed $\omega_1$ of auxiliary rotor 2 in conjunction with the rotation speed $\omega$ of impeller 1 to measure the flow rate $Q$, since the latter is substantially a linear function of $\omega$ and $\omega_1$.

As shown in FIG. 1, the walls of annular passage 17 are cylindrical, so that the flow therethrough consists of substantially parallel streamlines, at any rate if the fluid is a non-compressible liquid. Provided that auxiliary rotor 2 is located close enough to impeller 1, it can be assumed (FIG. 2) that a fluid leaving at a velocity $\vec{V}$ an impeller blade section 4a located at a distance $r$ from axis XX' will reach the blades 14 of auxiliary rotor 2 at the same distance $r$ from axis XX'. The magnitude $Vt$ of tangential velocity $\vec{Vt}$ is therefore equal to $\omega_1 r$. Consequently relation (2) can be written :

$$(\omega + \omega_1)r = kQ \tan \beta \tag{4}$$

and relation (4) becomes :

$$\omega + \omega_1 = AQ \tag{5}$$

With these assumptions, the sum $\omega + \omega_1$ of the absolute values of the impeller and auxiliary rotor rotation speeds is consequently proportional to the flow rate $Q$ and can provide an accurate measurement thereof even if it is very low (in theory anything above zero flow), even if the viscosity of the fluid is high and even if it varies accidentally.

If for some reason or other (such as the flow being a gas) the flow through passage 17 cannot be likened to a flow with parallel streamlines, then the flow leaving the blade section 4a (FIG. 2) at the velocity $\vec{V}$ will reach the auxiliary rotor blades 14a at a radial distance other than $r$, but on the other hand it can be assumed that the magnitude $\vec{Vt}$ of the tangential velocity is proportional to $\omega_1 r$, so that the relation between $\omega$, $\omega_1$ and $Q$ becomes:

$$\omega + a \omega_1 = AQ \tag{6}$$

the correction factor $a$ being a constant, and it is this relation that can provide an accurate measurement of $Q$.

If the conditions are such that relation (5) applies, then recourse may be had to the arrangement shown in FIG. 5, which differs from that in FIG. 4 in that the flow rate $Q$ is provided by the sum $\omega + \omega_1$ of the rotation speeds of impeller 1 and auxiliary rotor 2, parts performing like functions to those in FIG. 4 being designated by like reference numerals. The signals 18d and 19d emitted by demodulating circuits 22 and 27 respectively are applied to anticoincidence adder 32 which then furnishes a signal 32a the frequency $f3$ of which is proportional to $\omega + \omega_1$. This signal 32a is converted by converter 23 into an analog signal proportional to $\omega + \omega_1$, whereby the pointer of dial indicator 24 deflects proportionately to $\omega + \omega_1$ and can be calibrated to indicate the flow rate $Q$. The signal 32a is likewise applied to divider circuit 25, whereby integrator 26 indicates the throughput volume $\int Qdt$.

If, on the other hand, the conditions are such that relation (6) applies, the first step is to determine the correction factor $a$ in relation (6) by calibrating the flowmeter. This is done by noting the value of $\omega$ and $\omega_1$ corresponding to different values of the flow rate $Q$, thereby to determine the constant factor $a$ by which $\omega_1$ must be multiplied to make the sum $\omega + a\omega_1$ proportional to $Q$. The next step is then to substitute for the simple anticoincidence adder 32 a more complex circuit, well known per se, capable of performing the $\omega + a \omega_1$ operation.

As in the embodiment of FIG. 4, indicator 31 indicates the value of the ratio $\omega_1/\omega$ and activates a warning system if this ratio varies abnormally, such as through damage to a bearing or erosion of the propeller.

It can be most useful to be able to measure, at least approximately, the viscosity of a liquid substance flowing through a conduit of the kind used in industry. As indicated precedingly, a comparison between $\omega$ and $\omega_1$ provides an indication of the viscosity of the substance, and possibly even an approximate value thereof. Reference to FIG. 3 shows that the tangential velocity $\vec{Vt}$ of a substance of viscosity $v$ leaving the blade section 4a (FIG. 2) is measured by the length HM, the throughput velocity $\vec{Vd}$ by the length OM, and the tangential velocity $\vec{U}$ of blade section 4a by the length KM, the imaginary point M being located along the curve $S_oT_oS$ corresponding to a viscosity $v$. A substance of viscosity $v_1$ leaving section 4a with the same throughput velocity $\vec{Vd}$ will have a tangential velocity which is measured by the length $Hm_1$, and the tangential velocity of section 4a will be given by the length $KM_1$, the imaginary point $M_1$ being located on the curve corresponding to a viscosity $v_1$. As before, it can be assumed that the tangential velocity of section 4a is proportional to $\omega$ and that the tangential velocity of the fluid is proportional to $\omega_1$. Hence if $\omega$ and $\omega_1$ are known, it is possible to determine the viscosity of the substance.

The viscosity value as a function of $\omega$ and $\omega_1$ could, in theory at least, be calculated by the formulas and methods of fluid mechanics. However, the formulas for calculating the kinematic viscosity $v$ as a function of $\omega$ and $\omega_1$ would be extremely complex resulting in very lengthy calculations. It is accordingly preferable to determine the viscosity value with the help of a chart prepared after the apparatus has been calibrated. Such a chart can readily be prepared by causing substances of known viscosities to flow through conduit section 3 at different flow rates and by noting during each trial run the values of $\omega$, $\omega_1$, $v$, and possibly also of $Q$.

FIG. 6 shows by way of example the general aspect of such a chart, similar to FIG. 3, which would be obtained with the flow rate $Q$ represented along the X-axis, the line 33 being a plot of the sum $\omega + \omega_1$ represented along the Y-axis. It will be appreciated that the ($\omega + \omega_1$) value permits of positioning the line H'K' on the chart and that the $\omega_1$ value (for example) determines the length of the portion of this line lying between the point H' and its point of intersection M' or $M'_1$ or $M'_2$ or $M'_3$ with one of the lines $v$ or $v_1$ or $v_2$ or $v_3$ defining the viscosity value.

The chart could obviously be prepared in a different form. In particular, $\omega_1$ could be multiplied by the correction factor $a$ in relation (6) above, in other words lengths such as H'M' could be given the value a $\omega_1$ and lengths such as H'K' the value $\omega$. In practice, it will be found preferable to prepare a nomogram with aligned points for greater convenience.

It should be noted that, for obvious reasons, propeller-type flowmeters are devised as a rule so that variations in the viscosity of the substance have least possible effect on the rotation speed of the impeller. In a properly designed flowmeter, lines such as $v$, $v_1$, $v_2$, $v_3$ in FIG. 6 will accordingly lie very close together in what is termed the "tolerance envelope" of the apparatus, that is, for those $\omega$ values which provide a measurement of the flow rate with the required degree of accuracy. The viscosity measurement will consequently not be very accurate. However, the specialist in the art is well aware that it is possible to increase the viscosity friction of a impeller such as impeller 1, for instance by exercising less care over the surface condition and/or profile thereof (that is to say by increasing its surface roughness and/or by giving it a less hydrodynamically favorable shape) whereby to cause its rotation speed to be highly sensitive to viscosity. Since, as indicated precedingly, the rotation speed of auxiliary rotor 2 is unaffected by the viscosity, an apparatus similar to that shown in FIG. 1, having an impeller 1 the rotation of which is highly sensitive to the degree of viscosity, will provide a measurement of the viscosity with a fairly good degree of approximation, for in that case the lines $v$, $v_1$, $v_2$, $v_3$, in FIG. 6 will be somewhat spaced.

The present invention accordingly makes it possible to design an accurate flowmeter capable of giving an indication of the viscosity of the fluid, and also to design a measuring apparatus capable of furnishing a measurement of the viscosity of a substance flowing through a conduit with sufficient accuracy for industrial purposes. An apparatus of this kind can be placed in series with an accurate flowmeter.

It goes without saying that changes and substitutions of parts may be made in the exemplary embodiments hereinbefore described without departing from the scope of the invention. More specifically, instead of calculating the ratio $\omega_1/\omega$ by means of an analog operator which, because of its very nature, will not be very accurate, it would be possible to calculate the reciprocal ratio $\omega/\omega_1$ with great accuracy by means of a digital circuit, well known per se, that operates by comparing the frequencies $f$ and $f_1$ of signals 18d and 19d.

For the purpose of comparing $\omega$ and $\omega_1$ in order to monitor the degree of accuracy of the flow measurement, it would alternatively be possible to use a quantity which is a function of $\omega$ and $\omega_1$ but different from the ratio therebetween. An accurate measurement of the flow rate could be furnished by a linear function of $\omega$ and $\omega_1$ of a form different from relations (5) and (6), an example being the sum of the absolute values of $\omega$ and $\omega_1$ (each multiplied by a correction factor), in the form $b\omega + c \omega_1$.

The rotation speeds of the impeller and the auxiliary rotor can be measured by any convenient means. The operations which, on the basis of these rotation speeds, make it possible to determine the flow rate, the quantity dependent on $\omega$ and $\omega_1$ used to monitor the accuracy of the measurement, and the viscosity, can be performed by any convenient means and in particular by calculation or with the help of nomograms. Nor would it be a departure from the scope of the invention if the viscosity were to be determined by means of a computer on the basis of $\omega$ and $\omega_1$.

I claim:

1. Measuring apparatus designed to be placed in a conduit having a fluid flowing therethrough, comprising an impeller with skew blades supported for unrestrained rotation about a shaft positioned longitudinally in the conduit, whereby the impeller is capable of rotating with a rotation speed which between certain fluid flow rate and viscosity limits is substantially proportional to said flow rate; a rotor supported for unrestrained rotation coaxially with and downstream of said impeller and provided with blades lying substantially in planes passing through the common axis of the blades; and means for measuring the impeller and rotor rotation speeds $\omega$ and $\omega_1$, respectively.

2. Apparatus as claimed in claim 1, comprising computer means responsive to the rotation speed $\omega$ of the impeller for delivering a signal proportional thereto and representing the flow-rate of the fluid, and further computer means responsive to input signals representing the rotation speeds $\omega$ and $\omega_1$, of the impeller and rotor respectively, to deliver an output signal representing a comparison of said rotation speeds $\omega$ and $\omega_1$.

3. Apparatus as claimed in claim 2, wherein said output signal represents the value of the ratio $\omega/\omega_1$.

4. Apparatus as claimed in claim 2, comprising a warning system, and means activating the warning system in response to the output signal exceeding a predetermined value.

5. Apparatus as claimed in claim 1, comprising computer means responsive to input signals representing the rotation speeds $\omega$ and $\omega_1$, of the impeller and rotor respectively, to deliver an out signal proportional to a linear function of $\omega$ and $\omega_1$, and representing the flow-rate of the fluid.

6. Apparatus as claimed in claim 5, comprising further computer means responsive to said input signals to deliver a further output signal representing a comparison of said rotation speeds $\omega$ and $\omega_1$.

7. Apparatus as claimed in claim 5, wherein said further output signal represents the value of the ratio $\omega/\omega_1$.

8. Apparatus as claimed in claim 5, comprising a warning system, and means activating the warning system in response to the further output signal exceeding a predetermined value.

9. Apparatus as claimed in claim 1, comprising means for computing the viscosity of the fluid from the measured values, of the impeller and rotor rotation speeds $\omega$ and $\omega_1$, respectively.

10. Apparatus as claimed in claim 1, wherein at least one of the fluid dynamics characteristics of the impeller, consisting of the shape and the surface condition thereof, is selected so that the impeller rotation speed $\omega$ be strongly affected by the viscosity of the fluid, and the value of said viscosity can be derived from the measured values of the impeller and rotor rotation speeds $\omega$ and $\omega_1$, respectively.

11. Flow-meter designed to be placed in a conduit having a fluid flowing therethrough, comprising an impeller having blades of helical pitch, a rotor having substantially feathered blades positioned in the conduit downstream of the impeller, the impeller and rotor being each supported for unrestrained rotation about a shaft positioned longitudinally in the conduit, means for measuring the impeller and rotor rotation speeds $\omega$ and $\omega_1$, respectively, computer means responsive to the rotation speed $\omega$ of the impeller for delivering a signal proportional thereto and representing the flow-rate of the fluid, and further computer means responsive to the rotation speeds $\omega$ of the impeller and $\omega_1$, of the rotor to deliver an output signal representing a comparison of said rotation speeds $\omega$ and $\omega_1$, and wherefrom the accuracy of the flow-meter can be derived.

12. Flow-meter designed to be placed in a conduit having a fluid flowing therethrough, comprising an impeller having blade of helical pitch, a rotor having substantially feathered blades positioned in the conduit downstream of the impeller, the impeller and rotor being each supported for unrestrained rotation about a shaft positioned longitudinally in the conduit, means for measuring the impeller and rotor rotation speeds $\omega$ and $\omega_1$ respectively, and computer means responsive to the rotation speeds $\omega$ of the impeller and $\omega_1$ of the rotor to deliver a signal proportional to a linear function of $\omega$ and $\omega_1$ and representing the flow-rate of the fluid.

13. Flow-meter as claimed in claim 12, comprising further computer means responsive to the rotation speeds $\omega$ of the impeller and $\omega_1$ of the rotor to deliver an output signal representing a comparison of said rotation speeds $\omega$ and $\omega_1$ and wherefrom the accuracy of the flow-meter can be derived.

14. Viscometer designed to be placed in a conduit having a fluid flowing therethrough, comprising an impeller having blades of helical pitch, a rotor having substantially feathered blades positioned in the conduit downstream of the impeller, the impeller and rotor being each supported for unrestrained rotation about a shaft positioned longitudinally in the conduit, and means for measuring the impeller and rotor rotation speeds $\omega$ and $\omega_1$ respectively, whereby the value of the viscosity of the fluid can be derived from the measured values of said rotation speeds $\omega$ and $\omega_1$.

15. Viscometer as claimed in claim 14, wherein at least one of the fluid dynamics characteristics of the impeller, consisting of the shape and the surface condition thereof, is selected so that the impeller rotation speed is strongly affected by the viscosity of the fluid.

16. Apparatus as claimed in claim 9, wherein at least one of the fluid dynamic characteristics of the impeller, consisting of the shape and the surface condition thereof, is selected so that the impeller rotation speed be strongly affected by the viscosity of the fluid.

* * * * *

UNITED STATES PATENT OFFICE
CERTIFICATE OF CORRECTION

Patent No. 3,735,637     Dated May 29, 1973

Inventor(s) Pierre Marie Marcel Penet

It is certified that error appears in the above-identified patent and that said Letters Patent are hereby corrected as shown below:

On the cover sheet insert -- [30] Foreign Application Data    April 17, 1970   France 70/13988 --. Column 2, line 14, after "diagrammatic" insert -- view --. Column 3, line 16, column 4, lines 1, 9, 19, 20, 25, 32 and 47, column 5, line 48, before "flow", each occurrence, cancel "mass". Column 9, claim 2, line 20, cancel the comma before of; claim 5, line 32, change "out" to -- output --; claim 9, line 47, cancel the comma after values. Column 10, claim 11, line 13, cancel the comma before of; claim 12, line 19, change "blade" to -- blades --.

Signed and sealed this 20th day of August 1974.

(SEAL)
Attest:

McCOY M. GIBSON, JR.              C. MARSHALL DANN
Attesting Officer                 Commissioner of Patents